Figure 1:
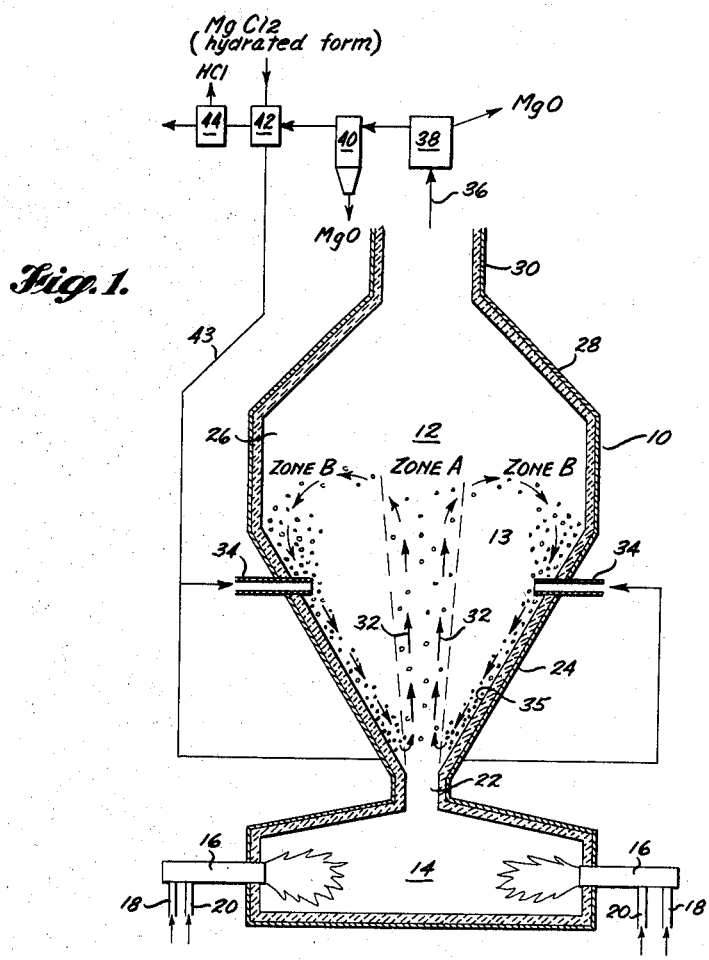

May 17, 1966    K. B. BENGTSON ET AL    3,251,650
METHOD AND APPARATUS FOR THE PREPARATION OF
MAGNESIUM OXIDE BY A SPOUTING BED TECHNIQUE
Filed April 1, 1963

INVENTORS
KERMIT B. BENGTSON
LENNART N. JOHANSON
JAMES C. ALMOND
BY
Mathis & Graybeal
ATTORNEYS

# United States Patent Office 3,251,650
Patented May 17, 1966

3,251,650
METHOD AND APPARATUS FOR THE PREPARATION OF MAGNESIUM OXIDE BY A SPOUTING BED TECHNIQUE
Kermit B. Bengtson, Richland, and Lennart N. Johanson and James C. Almond, Seattle, Wash., assignors to Twin Sisters Magnesia & Chemical Corporation, Richland, Wash., a corporation of Washington
Filed Apr. 1, 1963, Ser. No. 269,311
8 Claims. (Cl. 23—201)

The present invention relates to the recovery of magnesium oxide from hydrated magnesium chloride. It pertains particularly to a process and apparatus for the recovery from hydrated magnesium chloride of magnesium oxide in the form of an easily collectable ash. Simply stated, the process comprises decomposing magnesium chloride by heat in a fluidized bed reaction chamber (preferably of the spouted bed type) in the presence of steam, discharging the resulting magnesium oxide ash and gases from the top of such bed, and separating the magnesium oxide from the said gases.

It is well known that magnesium chloride decomposes when heated in the presence of water to form magnesium oxide and hydrochloric acid gas and that such decomposition normally takes place in several steps as the temperature is raised. Magnesium chloride is normally obtained in a hydrated form, and when it is heated at first water evaporates and then at the higher temperatures the magnesium chloride decomposes. The chemical reactions occurring during the decomposition phase are complex, but may be illustrated generally by the following equations:

(1)   $MgCl_2 + H_2O \rightarrow MgOHCl + HCl$
(2)   $MgOHCl \rightarrow MgO + HCl$
(3)   $MgCl_2 + H_2O \rightarrow MgO + 2HCl$ Thermodynamic studies by Kelley (U.S. Bureau of Mines Technical Paper No. 676, 1945) of these reactions show that it is theoretically possible to achieve complete decomposition of the magnesium chloride into magnesium oxide and hydrogen chloride at relatively low temperatures. Kelley's findings have disclosed the theoretical basis for early investigations and have suggested the decomposition process to many recent investigators as a means of manufacturing either magnesium oxide or hydrogen chloride, or both. However, previous commercial attempts to decompose magnesium chloride to recover magnesium oxide and/or hydrochloric acid have met with only very limited success primarily on account of difficulties encountered with the large-scale transfer of thermal energy into the material to be decomposed and the mechanical types of decomposition equipment used.

Before magnesium chloride can be thermally decomposed on a commercial scale, the chemical conditions necessary for substantially complete decomposition must be established and then maintained within a relatively large reaction vessel. Secondly, a way must be found to either generate within or transfer into the reaction vessel the amount of thermal energy required to cause the reactions to take place. Thirdly, the decompositions reactions must be carried out in the presence of an amount of steam sufficient to permit the decomposition to proceed, yet at the same time in the presence of a sufficiently limited amount of steam so that the vapors discharged from the reaction vessel can be condensed to yield hydrochloric acid of a commercially usable concentration. Fourthly, the magnesium oxide must be removed from the reaction vessel in such a way that contamination with unreacted material and/or reversal of the completed decomposition reaction are avoided.

The heating problem is complicated by the fact that at the temperatures existing in the reaction vessel the evolved hydrogen chloride vapors attack most metals which might be utilized in the construction of heat transfer surfaces. In addition, the hydrated magnesium chloride tends to melt and cling to the walls of the reaction vessel, forming ultimately a solid material that is very difficult to remove. This deposit is a poor conductor of heat and adversely affects the amount of heat which can be delivered into certain types of equipment, thereby severely limiting the rate at which the reaction might be carried out in such equipment. In any case it represents loss of usable product, its physical presence as it builds up will interfere with use of the equipment, and its removal will usually necessitate shutdown of the equipment to permit removal by mechanical means.

According to one known process, the magnesium chloride in atomized liquid form is passed concurrently through a reaction chamber with steam at a temperature of the order of about 1500° C. or higher. The use of steam as a heating medium is unsatisfactory because it results in the evolution of hydrochloric acid so dilute that it has little commercial value.

According to another process the magnesium chloride is sprayed countercurrently into a stream of hot gases traveling longitudinally through a reaction chamber. In such process the entering hot gases are at a temperature between 750° C. and 1100° C., considerably below normal flame temperatures. The sensible heat recoverable from such hot gasses per unit of their volume is small, making necessary the passage of an extremely large amount of such gases through the system to secure only a relatively small amount of magnesium oxide product. The resulting relatively small rate of thermal decomposition per unit of reactor volume necessitates the use of a reaction chamber of an extremely larger volume in order to produce an appreciable amount of magnesium oxide product per unit of operating time. Another disadvantage is that the magnesium chloride must be subdivided into extremely small particles in order for it to be effectively decomposed by this method. Atomizing nozzles must be used to effect the subdivision required, and the conditions which exist in the reaction chamber are anything but favorable for effective operation of atomizing nozzles. Furthermore, the small subdivision of the magnesium chloride results in the formation of a finely divided magnesium oxide product which is extremely difficult to recover from the large volume of waste gases. Acid recovery from large volumes of waste gases is also most difficult.

A process for the production of magnesium oxide from magnesium chloride, but which is intended to yield primarily chlorine as a co-product instead of hydrochloric acid is disclosed in U.S. Patent No. 2,954,277, issued September 27, 1960, to A. M. Thomsen. Such process requires the use of a plurality of reaction chambers, and further requires a complicated and costly procedure for the preparation of feed materials to be introduced into the reaction chambers. Many other processes, capable of accepting only a solid feed which would not melt, suffer from the same disadvantage.

The present invention is directed to the provision of a practical and economical process for recovering magnesium oxide from magnesium chloride in which the conditions necessary for efficient decomposition are established in a more expeditious manner than has previously been the case.

One object of this invention is to produce magnesium oxide from hydrated magnesium chloride and to do it in such a manner that the melting of the hydrated magnesium chloride during the first stage of decomposition, or the use of liquid feed, do not interfere with the practical operation of this thermal decomposition reaction in a fluidized bed. A fluidized bed reaction chamber is employed in the process containing in the fluid bed inert refractory particles large enough so that the dynamic forces acting on these particles keeping them moving are greater than cohesive forces existing due to the presence of liquid in the bed.

This increased effect of dynamic forces as compared to cohesive forces arises from the larger ratio of cross-sectional area to contact area between particles which obtains in the case of the larger bed particles, and the use of higher gas velocities to keep them in motion. Small bed particles, as normally employed in fluid beds and which would tend to predominate if magnesium chloride were decomposed in a flud bed in the absence of the large inert refractory bed particles, have a strong tendency in the presence of even small amounts of liquid to stick together and thus stop moving. The result in the practice of this invention is the attainment of the high heat transfer capability of the fluidized bed without experiencing loss of bed fluidity due to the presence of a considerable amount of liquid phase magnesium-containing material in the bed.

Another object of this invention is to present a decomposition process having a high thermal efficiency and a high unit capacity rating, high unit capacity rating meaning that a relatively large amount of magnesium oxide product is produced per unit of operation time per unit volume of reaction vessel.

Still another object of this invention is to provide a thermal decomposition process in which atomization of the hydrous magnesium chloride feed material is not essential.

A further object of this invention is to provide a thermal decomposition process by which hydrated magnesium chloride can be decomposed into magnesium oxide in the form of an easily collectable ash, and hydrogen chloride gas which can be economically recovered as commercial strength hydrochloric acid.

A still further object of this invention is to provide a process and apparatus for thermally decomposing hydrated magnesium chloride into magnesium oxide in a fluidized bed wherein combustion gases are used as the thermal energy source for the process, and wherein such gases are fed from the combustion chamber directly into the fluidized bed at flame temperature, i.e. without precooling as by the addition of diluent gases, etc.

An additional object of the invention is the provision of a fluidized bed of a character allowing the employment therein of combustion gases of high entrance velocity, thereby providing a high unit capacity rating, without eluting magnesium containing feed material from said bed before decomposition of such material is completed.

According to the present invention, hydrated magnesium chloride is continuously added in either liquid or solid form into a fluidized bed, preferably of the "spouting" or "spouted bed" type, consisting essentially of particles of an inert refractory material heated and maintained in a fluidized state by the upward traverse through same of hot gases, preferably as hot combustion gases. The hydrated magnesium chloride feed material contacts the heated bed particles and is converted into a porous ash consisting essentially of pure magnesium oxide, with attendant evolution of gaseous hydrochloric acid. The magnesium oxide ash thus formed is then elutriated from the bed by the rising mixture of exhaust and acid gases. When outside the bed region it is separated from said gases by suitable means, such as a cyclone separator. The hydrochloric acid gas is next recovered from the exhaust gases by condensation and/or absorption in water.

The term "spouted bed" is used throughout this specification to designate a fluidized bed of the type generally characterized by a central zone of upwardly moving solid particles spilling over at its upper end radially outwardly into a substantially annular zone of descending solid particles. An important and distinguishing characteristic of the fluidized or spouted bed of the present invention is the relative coarseness of the particles employed therein in comparison with the particles of a conventional fluidized bed. As previously noted, relatively large bed particles are employed in order that the dynamic forces acting on such particles be greater than the cohesive forces existing due to the presence in the bed of liquid phase magnesium chloride and tending to cause the particles to stick together and thus stop moving. More specifically, the bed particles used in the fluidized or spouted bed of the present invention are of a size falling within the range of 0.4 inch to 60 mesh (.01 inch), and preferably within the range of —3+8 mesh (i.e. such particles will pass through a three mesh screen and will be retained on an eight mesh screen, with three mesh being substantially equal to 0.26 inch and eight mesh being substantially equal to 0.09 inch), whereas the bed particles used in conventional fluidized beds are considerably smaller.

Figure 2:
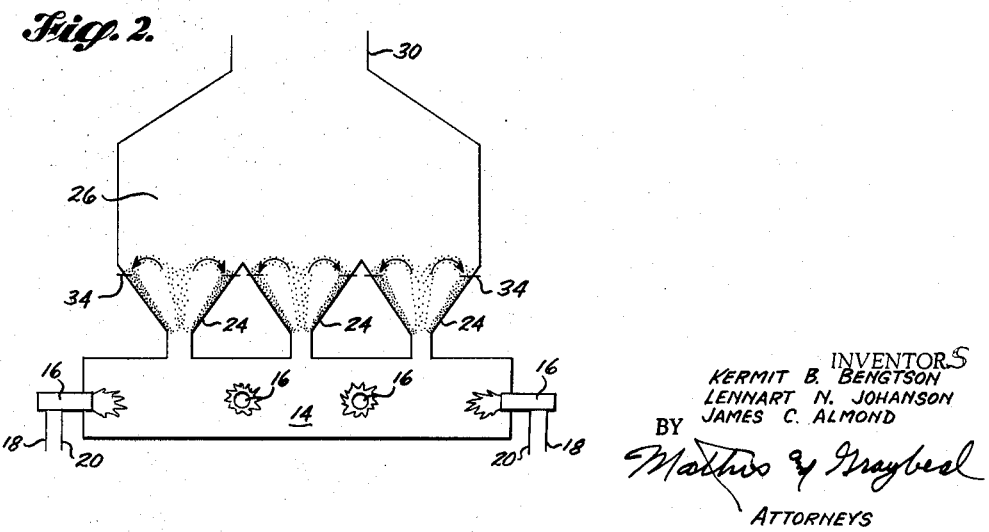

For a better and more complete knowledge of the invention, reference should be made to the following description, together with the accompanying drawing wherein:

FIG. 1 is a flow plan of the process of the present invention and includes therein on a larger scale a vertical sectional view of a typical and therefore non-limitive form of the spouted bed type reaction chamber used in such process; and FIG. 2 is a vertical sectional view of a modified form of the invention wherein plural reaction chambers are employed.

Referring to FIG. 1 of the drawing, a reactor 10 is shown as including a spouted bed reaction chamber 12 and a combustion chamber 14 for producing the hot gases which heat and keep the bed particles in suspension. Combustion chamber 14 is provided with one or a plurality of burner mechanisms 16 of conventional design and including fuel and air supply lines 18, 20. Such supply lines 18, 20 are each provided with suitable control means (not shown) whereby the amounts of fuel and air delivered into the combustion chamber can be properly controlled. Also sufficient moisture (10–20% derived from the combustion process or otherwise introduced) is present in the gases leaving combustion chamber 14 to take care of the water necessary for the chemical reactions involved. An orifice 22 forms an outlet for combustion chamber 14 and an inlet for the spouted bed reaction chamber 12.

Spouted bed reaction chamber 12 is provided with an upwardly diverging conical entry portion 24, central disengaging space 26 and an exit portion 28 terminating in an outlet duct 30. While it is important for entry portion 24 to have a conical shape, disengaging zone 26, exit portion 28 and outlet duct 30 may vary in shape from those shown.

The bed 13 consists of particles of an inert refractory material, such as periclase, alumina, or silicon carbide, for example, of a size substantially within the previously mentioned range of sizes. When any liquid solution is injected into a bed of finely divided particles fluidized with a gas, the tendency is for the solution to wet the particles and for the wetted particles to stick together in the same fashion that wet sand particles stick together whereas dry sand particles do not. This is a surface effect, and it is proportionately much greater when very small particles are used in the fluidized bed. The hot gases passing upwardly through the bed particles exert dynamic forces on such particles tending to keep them in motion. In accordance with the present invention relatively large bed particles are employed and the dynamic forces acting on such particles are substantially greater than the cohesive forces, and bed fluidity is maintained. In other words the mechanical stresses on the liquid or partly solidified film are sufficient, because of the relative large particle sizes, to overcome the cohesive forces of the liquid film.

Combustion chamber 14 is operated such that the hot gases passing through orifice 22 have sufficient velocity to impart a substantial lifting force on the particles in the central zone of bed 13, designated zone A in the drawing. The upward traverse of hot gases through bed 13 causes the whole mass of particles to behave in a fashion somewhat similar to a liquid. Due to the nozzle-like construction of orifice 22, the upwardly diverging construction of entry portion 24 and the operation of combustion chamber 14, the particles within zone A are moved by the gases in a generally upwardly direction until they approach the top of the bed whereupon they move radially outwardly and then descend in a generally annular shaped zone, designated zone B in the drawing (direction of motion indicated by arrows 32). The descending particles replace those particles being drawn into the central zone at the bottom of the bed. The upwardly moving hot gases through orifice 22 prevent particles from falling downward through orifice 22. Heat is vary rapidly transferred in the central zone from the high velocity combustion gases entering through orifice 22 to the bed particles. Even though the combustion gases have a very brief stay within bed 13, such gases are cooled to essentially the bulk temperature of the bed solids before they leave the bed 13. Preferably, the gases entering bed 13 through orifice 22 are at or near the normal flame temperature attained by burning a fuel such as natural gas with air.

The hydrous magnesium chloride is introduced through feed pipes 34 into the bed 13 into zone b where the movement of the particles is generally downward. The reason for this will be clear when it is remembered that the principal feature of the invention is to provide suitable conditions for the transfer of a considerable quantity of heat energy into the feed material in order to cause its chemical decomposition. The amount of heat so transferred is dependent, among other factors, on contact with or the proximity to hot surfaces and the amount of time available for heat transfer, i.e. the amount of residence time in the bed 13. The feed pipees 34 are located to discharge into the zone where the movement of the particles is downward so as to entrap the feed material for the longest possible time amongst the bed particles.

The bed particles circulate rapidly enough so that their temperature will drop only a small amount while they are out of the main stream of hot gases or come in contact with the feed, and will rise only by a small amount when in the main hot gas stream. Product magnesium oxide is elutriated from the bed as it is formed, but the inert refractory particles, being more massive, remain in the bed.

The feed pipes could be placed at other locations, but with adverse effects on thermal efficiency, product quality, and the capacity of the system. Location above the bed or directly above an orifice 22 would be particularly undesirable, as this not only would yield the shortest residence time but would result in contamination of the magnesium oxide ash being elutriated from the bed with entering undecomposed feed material.

Strictly speaking, there is no upper temperature limit for effecting the thermal decomposition but the thermal efficiency of the process drops rapidly with increasing temperature because the exhaust gases leave at the temperature of the fluid bed, carrying with them increased amounts of lost sensible heat at higher temperatures. Practically speaking, the upper temperature limit is about 700° C. There is no definite lower temperature limit either, the temperature at which magnesium chloride decomposes being a function of the composition of the surrounding atmosphere, as described by Kelley. Practically speaking the lower temperature limit is about 500° C. This limit is dictated by the requirement that the decomposition reaction takes place at a reasonably high rate, and that the diluent gases present be held to a minimum. An average bed temperature of approximately 600° C. has been found to give the most favorable results and is preferred for magnesium chloride decomposition.

The feed material is preferably introduced at a pressure to flow to be poured or spilled into reaction chamber 12 through feed pipes 34, which need not be provided with nozzles or atomizing devices. Dehydration and thermal decomposition of the liquid hydrate begins at once upon contact of the feed material with the bed particles. The solution does not at first wet the particle surfaces, but boils vigorously and is insulated from contact with such particles by a film of generated vapor. As evaporation proceeds toward dryness there is a brief transitory period during which the liquid phase material may adhere to the heat transfer surface. As decomposition occurs the material quickly changes to a very porous solid that may adhere temporarily to the particles, and the formation of which is accompanied by the evolution of variable amounts of hydrogen chloride and water vapor. Continued contact of this material with the particles results in further decomposition to form magnesium oxide in the form of a powder which does not adhere to the heat transfer surface and an additional amount of hydrogen chloride is evolved. Eventually the magnesium oxide ash is elutriated from the bed and later recovered, as hereinafter described.

The bed particles are cooled only in incremental amounts by the decomposition taking place and are shortly recirculated into zone A above orifice 22 where reheating takes place. Heat transfer between the combustion gases and the circulating bed particles is sufficiently good that the combustion gases are cooled during their passage through the bed from the high flame temperature to substantially the chosen temperature at which they are to issue from the bed, i.e. about 600° C.

Entry portion 24 is preferably lined with a highly refractory material 35 having a high thermal conductivity, such as silicon carbide.

Referring again to the drawing, the exhaust gases leaving through outlet duct 30 first pass through a chemically resistant conduit, shown schematically by line 36, into a chamber 38 where most of the magnesium oxide ash will separate out. The exhaust gases will exit from the top of this chamber and go into one or more cyclone separator means, a cyclone separator 40 being illustrated, where substantially all of the remaining solids will be removed. The gases next go into a spray tower 42 where their sensible heat will be utilized to effect some evaporation from magnesium chloride feed (note conduit 43 in FIG. 1), and where any remaining magnesium oxide will be scrubbed out. The gases finally go to an acid condenser 44 where the hydrogen chloride is recovered as hydrochloric acid. The first chamber 38 and the cyclone separator 40 are operated at substantially the temperature at which the gases exit from the bed so that during those phases of the exhaust gas treatment, reversal of the decomposition reactions will not occur. Like reaction chamber 12, each of the conduits and chambers which follow are of suitable acid-resistant construction and insulated against heat loss.

The magnesium chloride feed material might be acquired from a siliceous magnesium mineral such as olivine, serpentine, etc., by means of an acid leaching process carried on concurrently with the instant process and employing hydrochloric acid as the leach agent. If such is the case, the hydrochloric acid recovered in the instant process may be used in the leaching process.

The process of the invention is now illustrated specifically by the following example:

*Example*

Approximately 300 grams of inert refractory aluminum silicate pellets, about ⅛ inch in diameter (through 6 mesh), were fluidized in a 3 inch diameter column by means of hot gases introduced through a ¾ inch cluster of small holes serving essentially as a single orifice and located in the bottom of the column. Circulation of these pellets upwardly in the region above the cluster of holes was visually observed, as was circulation downwardly of other parts of the bed. All of the pellets very quickly become extremely hot, but cooled upon the addition of magnesium chloride hydrate. Approximately 100 grams of $MgCl_2.6H_2O$ were added more or less continuously during a period of about 15 minutes. Some of the magnesium chloride material was added as a solid and some as a liquid. The liquid feed was observed first to boil and then to solidify as described above. Solid feed added to the bed melted and then behaved in a fashion similar to the liquid material. Accidental addition of an unusually large increment of feed material was observed to momentarily lower the overall bed temperature, but not to affect seriously the quality of the bed fluidization. A fine ash comprising essentially pure magnesium oxide was elutriated from the bed all during the course of the run. Following completion of the run it was noted that no unreacted hygroscopic chloride hydrate remained in the bed, and that the inert refractory material could be poured from the bed as free flowing, apparently unchanged pellets.

FIG. 2 shows a modified form of the invention wherein reactor 10 includes a plurality (three being shown by way of example) of spouted bed reaction chambers 12 having separate conical shaped entry portions 24 communicating with a single common disengaging space 26. Disengaging space 26 in turn connects with a single outlet duct 30. Of course, when a plurality of reaction chambers 12 are supplied with hot gases from a single combustion chamber 14, such combustion chamber 14 must include additional burners 16 and be otherwise designed to handle the increased demand for combustion gases.

The process of the present invention thus affords a practical, economical method for the recovery of magnesium oxide from magnesium chloride, wherein the magnesium oxide product is obtained in a substantially pure and easily collectable state.

Having now described our invention in preferred embodiments, what we claim as new and desire to protect by Letters Patent is:

1. A method of obtaining magnesium oxide from hydrated magnesium chloride which comprises continuously adding said hydrated magnesium chloride into a fluidized bed consisting of particles of an inert refractory material maintained in a fluidized state by the upward traverse through same of hot gases, whereby the hydrated magnesium chloride is converted into a porous ash consisting essentially of pure magnesium oxide, with attendant evolution of hydrochloric acid gas; and recovering the magnesium oxide ash elutriated from the fluidized bed by the exiting gases.

2. A method of obtaining magnesium oxide from hydrated magnesium chloride which comprises continuously adding said hydrated magnesium chloride in liquid form into a fluidized bed consisting of particles of an inert refractory material maintained in a fluidized state by the upward traverse through same of hot gases, whereby the hydrated magnesium chloride is converted into a porous ash consisting essentially of pure magnesium oxide, with attendant evolution of hydrochloric acid gas; and recovering the magnesium oxide ash elutriated from the fluidized bed by the exiting gases 3. A method of obtaining magnesium oxide from hydrated magnesium chloride which comprises continuously adding said hydrated magnesium chloride in a solid form into a fluidized bed consisting of particles of an inert refractory material maintained in a fluidized state by the upward traverse through same of hot gases, whereby the hydrated magnesium chloride is converted into a porous ash consisting essentially of pure magnesium oxide, with attendant evolution of hydrochloric acid gas; and recovering the magnesium oxide ash elutriated from the fluidized bed by the exiting gases.

4. A method of obtaining magnesium oxide from hydrated magnesium chloride which comprises continuously adding said hydrated magnesium chloride into a spouting fluidized bed consisting essentially of particles of an inert refractory material maintained in a fluidized state and heated to an average temperature of approximately 600° C. by the upward traverse through some of hot gases, whereby the hydrated magnesium chloride is converted into a porous ash consisting essentially of pure magnesium oxide, with attendant evolution of hydrochloric acid gas; and recovering the magnesium oxide ash elutriated from the fluidized bed by the exiting gases.

5. A method of obtaining magnesium oxide from hydrated magnesium chloride which comprises continuously adding said hydrated magnesium chloride in liquid form and as a flowing liquid stream into a spouting fluidized bed consisting essentially of particles of an inert refractory material maintained in a fluidized state and heated to an average temperature of approximately 600° C. by the upward traverse therethrough of hot products of combustion, such particles of inert refractory material being of a size approximately within the range of —3 to +8 mesh, and the velocity of the hot products of combustion being large enough to keep the particles in motion although not large enough to elutriate them from the bed, whereby the hydrated magnesium chloride is converted into a porous ash consisting essentially of pure magnesium oxide, with attendant evolution of hydrochloric acid gas; and recovering the magnesium oxide ash elutriated from the fluidized bed by the exiting gases.

6. A method of obtaining magnesium oxide from hydrated magnesium chloride comprising continuously introducing hydrated magnesium chloride into direct heat exchange contact with hot, fluidized particles of an inert material; concurrently heating and fluidizing such particles by the upward traverse through same of heated gases, such hydrated magnesium chloride existing in the liquid phase during part of the time it is in contact with said particles thus creating cohesive forces tending to stick said particles together and stop their moving, the process further characterized by the inert particles being sufficiently large that the dynamic forces tending to keep such particles in motion are greater than the cohesive forces existing due to the presence of liquid phase magnesium chloride, whereby continuous contact of the hydrated magnesium chloride with the hot fluidized particles causes said hydrated magnesium chloride to ultimately decompose into magnesium oxide, with attendant evolution of hydrochloric acid gas, and recovering the magnesium oxide so produced.

7. A method for obtaining magnesium oxide from hydrated magnesium chloride, said method comprising:
 (a) flowing hot gas through a fluidized bed of particles of an inert refractory material;
 (b) said particles having a size approximately within the range of —3 to +8 mesh;
 (c) flowing hot gas upwardly through said particles to maintain the same in a fluidized state and to heat the particules to a temperature in the range of about 500° C. to 700° C.;
 (d) flowing the hot gas upwardly at such a velocity as to keep the particles in a fluidized state with said hot gas flowing upwardly through the particles to elevate the particles in a chimney effect and to allow the elevated particles to move outwardly and away from the upwardly flowing hot gas so as to fall downwardly;
 (e) adding the hydrated magnesium chloride to the particles in the fluidized state with the particles flowing downwardly;
 (f) said hydrated magnesium chloride contacting said hot inert refractory material and decomposing into a porous ash of magnesium oxide and hydrochloric acid gas;
(g) said hot gas flowing upwardly elevating and removing said ash of magnesium oxide and hydrochloric acid gas from the vicinity of the particles; and,
(h) recovering the magnesium oxide ash from the hot gas.

8. An apparatus for preparing magnesium oxide from hydrated magnesium chloride, said apparatus comprising:
(a) a reaction chamber;
(b) said reaction chamber having an inlet orifice means;
(c) a generally conical entry portion above and juxtapositioned to said inlet orifice means;
(d) a disengaging zone;
(e) an outlet;
(f) a fluidized bed of particles of an inert refractory material;
(g) said fluidized bed of particles substantially filling said entry portion and partially extending into said disengaging zone;
(h) means for heating and causing the flow of hot gas through said inlet orifice means, into said reaction chamber, and through said fluidized bed of particles thereby causing the particles to be heated and to move upwardly in a central zone and then to move radially outwardly and to descend as a generally annular zone;
(i) means for introducing hydrated magnesium chloride into a zone of the reaction chamber wherein the particles are descending whereby the hydrated magnesium decomposes into a porous ash consisting essentially of pure magnesium oxide with attendant evolution of hydrochloric acid gas;
(j) said magnesium oxide and hydrochloric acid gas being elevated upwardly by the hot gas and out of the reaction chamber and through the outlet; and,
(k) means for separating the magnesium oxide from the hot gas.

References Cited by the Examiner

UNITED STATES PATENTS

| | | | |
|---|---|---|---|
| 1,475,502 | 11/1923 | Manning | 23—1 X |
| 2,666,269 | 1/1954 | Parry | 34—10 |
| 2,694,620 | 11/1954 | Lathe | 23—201 |
| 2,706,145 | 4/1955 | Cannon | 23—154 X |
| 2,760,917 | 8/1956 | Ward | 23—288.3 |
| 2,786,280 | 3/1957 | Gishler et al. | 34—10 X |
| 2,954,277 | 9/1960 | Thomsen | 23—201 |
| 2,968,683 | 1/1961 | Kossmann | 34—10 X |
| 3,043,657 | 7/1962 | Hughes et al. | 23—142 |
| 3,101,249 | 8/1963 | Priscu | 23—87 |

FOREIGN PATENTS 141,861   1/1961   Russia.

OSCAR R. VERTIZ, *Primary Examiner.*

MAURICE A. BRINDISI, BENJAMIN HENKIN,
*Examiners.*

G. T. OZAKI, *Assistant Examiner.*